US 6,747,805 B2

(12) United States Patent
Sayag (10) Patent No.: US 6,747,805 B2
(45) Date of Patent: Jun. 8, 2004

(54) DESIGN AND FABRICATION PROCESS FOR A LENS SYSTEM OPTICALLY COUPLED TO AN IMAGE-CAPTURE DEVICE

(75) Inventor: Michel Sayag, 1820 Hackett Ave., Mountain View, CA (US) 94043

(73) Assignee: Michel Sayag, Mountain View, CA (US)

( * ) Notice: Subject to any disclaimer, the term of this patent is extended or adjusted under 35 U.S.C. 154(b) by 3 days.

(21) Appl. No.: 10/202,454

(22) Filed: Jul. 22, 2002

(65) Prior Publication Data

US 2003/0016452 A1 Jan. 23, 2003

Related U.S. Application Data

(60) Provisional application No. 60/307,058, filed on Jul. 20, 2001.

(51) Int. Cl.$^7$ .............................. G02B 3/00; G02B 9/04; G02B 9/00; H04N 5/225
(52) U.S. Cl. ........................ 359/664; 359/793; 359/797; 348/340
(58) Field of Search ................................. 359/620, 664, 359/710, 715, 717, 738, 797, 793, 794, 795, 796, 798; 348/335, 340

(56) References Cited

U.S. PATENT DOCUMENTS

| | | | | |
|---|---|---|---|---|
| 3,217,596 A | * | 11/1965 | Murray et al. | 359/793 |
| 3,514,186 A | * | 5/1970 | Poncelet | 359/664 |
| 4,030,817 A | * | 6/1977 | Westell | 359/888 |
| 4,687,285 A | | 8/1987 | Hily et al. | |
| 5,801,681 A | | 9/1998 | Sayag | |
| 2001/0050721 A1 | * | 12/2001 | Miyake | 348/340 |
| 2003/0156213 A1 | * | 8/2003 | Doering et al. | 348/340 |

FOREIGN PATENT DOCUMENTS

WO    WO92/15036    9/1992

\* cited by examiner

*Primary Examiner*—Georgia Epps
*Assistant Examiner*—Alicia M. Harrington
(74) *Attorney, Agent, or Firm*—Beyer, Weaver & Thomas, LLP.

(57) ABSTRACT

Simple, inexpensive and durable multi-element lens systems are provided. These lens systems may be optically coupled to digital image-capturing devices, such as those used in digital cameras. Some lens systems of the present invention include a glass microsphere bonded to a planar surface of a glass hemisphere. In preferred lens systems, the thickness of the glass hemisphere is selected to form an image plane for transmitted light that is tangent to the surface of the microsphere. Accordingly, in digital cameras fabricated with such lens systems, the glass microsphere can be attached directly to a digital image-capturing device. These preferred lens systems require no focusing adjustment and are suitable for applications to requiring a wide field of view. In some embodiments, the glass microsphere is bonded to the glass hemisphere using a light-absorbing material in order to create an apodized pupil. Some such embodiments are fabricated with a light-absorbing material with an absorption coefficient that varies according to the wavelength of transmitted light.

32 Claims, 11 Drawing Sheets

Diffraction-limited MTF (apodized vs. non-apodized lens)

| Surf | Type | Radius | Thickness | Glass | Diameter |
|---|---|---|---|---|---|
| OBJ | STANDARD | Infinity | 70.1778 | | 71.23298 |
| 1 | STANDARD | 1 | 1.159787 | FK51 | 2 |
| 2 | STANDARD | Infinity | 0 | 1.539000, 45.000000 | 2 |
| 3 | STANDARD | 1 | 0 | 1.539000, 45.000000 | 0.54 |
| 4 | STANDARD | 1 | 2 | F_SILICA | 2 |
| 5 | STANDARD | -1 | 0.01 | 1.539000, 45.000000 | 2 |
| IMA | STANDARD | Infinity | | 1.539000, 45.000000 | 2.37 |

| Surf | Type | Radius | Thickness | Glass | Diameter |
|---|---|---|---|---|---|
| OBJ | STANDARD | Infinity | 70.1778 | | 70.89748 |
| 1 | STANDARD | 0.8790182 | 0.9070419 | FK51 | 1.76 |
| 2 | STANDARD | Infinity | 0 | 1.582000, 33.000000 | 1.76 |
| 3 | STANDARD | 1 | 0 | 1.582000, 33.000000 | 2 |
| 4 | STANDARD | 1 | 2 | F_SILICA | 2 |
| 5 | STANDARD | -1 | 0.01 | 1.582000, 33.000000 | 2 IMA |
| | STANDARD | Infinity | | 1.582000, 33.000000 | 2.16 |

DESIGN AND FABRICATION PROCESS FOR A LENS SYSTEM OPTICALLY COUPLED TO AN IMAGE-CAPTURE DEVICE

RELATED APPLICATION

This application claims priority to U.S. Provisional Patent Application No. 60/307,058, filed Jul. 20, 2001, which is hereby incorporated by reference for all purposes.

BACKGROUND OF THE INVENTION

The present invention is related to the field of electronic imaging and more specifically relates to methods for fabricating, assembling and optically coupling a multi-element lens system to an image-capture device.

In the field of electronic imaging, digital cameras are constructed using digital image-capture devices such as CCD or CMOS image sensors, and lenses made of glass or plastic materials. High quality digital cameras often have lens systems with variable aperture (iris), variable focal length (zoom) and variable focus. Low cost digital cameras on the other hand often have lens systems with fixed aperture, fixed focal length and fixed focus. Attempts have been made to reduce the cost of such lens systems as well as the cost of assembling and focusing them on low cost digital cameras.

Different methods have been suggested to optically couple the lens system directly to the image-capture device. Optically coupling the lens system to the image-capture device may be accomplished, for example, by gluing the optical element closest to the image-capture device onto its image-sensing surface. One such method is described in international patent application WO 92/15036, the entire disclosure of which is incorporated herein by reference for all purposes. Unlike film cameras where the lens system cannot touch the film (since the film is moved from one picture-taking event to another), digital cameras can be designed with a lens system that touches the image-sensing surface of the capture device.

The benefits of having the lens system touch the image-capture device are numerous. Firstly, the window that usually protects the image-capture device is eliminated. Eliminating this window reduces manufacturing and assembly costs and improves image quality by eliminating unwanted reflections off the surfaces of the window. Secondly, the overall size of the camera can be reduced, especially its thickness, since the lens system can be mounted closer to the image-capture device. This is particularly important for camera modules that are intended for cellular phones, personal digital assistants (PDAs) and laptop computers. In these products, space is a premium and every effort is made to reduce the size of all the components. Finally, optically coupling the lens system to the image-capture device alleviates misalignments, defocusing and other faulty adjustments that can occur if the camera is dropped or mishandled and the lens system is not firmly attached to the image-capture device.

Unfortunately, existing methods for optically coupling the lens system to the image-capture device do not eliminate the laborious step of focusing the lens system onto the image-capture device nor do they reduce the complexity of the lens system. With current methods, the optical combination is not significantly simplified by optically coupling the lens to the image-capture device.

The optical combination is dictated by the overall performance requirement of the camera. Various lens combinations can meet a particular system requirement for field of view, aperture (referred to as f number) and modulation transfer function (referred to as MTF). Typically, a certain number of lens elements are necessary to achieve certain performance levels. For instance, if a narrow field of view is required (i.e., less than 20 degrees) a single element design can usually meet such a requirement, provided that the required aperture is not too large (i.e., a relatively high f number). Such a design can be created with a single piano-convex lens as described in international patent application WO 92/15036. The complexity (and the cost) of the lens increases significantly when the requirement for the field of view increases from 20 degrees to 50 degrees while the aperture is kept relatively high (low f number, e.g. f/3).

Commonly, such lenses are made of four to six elements of different glass materials to correct for chromatic aberrations. A selection of such lenses can be found in the 2000 Edmund Scientific catalog entitled "Electronic imaging Components" on pages 50 to 55. As the number of elements increases, the material cost and assembly cost of the lens system both increase.

Attempts have been made to reduce the number of lens elements by using aspherical elements, specifically injection-molded plastic aspherical elements. Plastic lens elements are well suited for certain applications, such as disposable film cameras where the image area is very large (800 mm$^2$) and the spatial resolution is fairly low (20 lp/mm). They do not work well, however, with the latest generation of CCD and CMOS capture devices which have a photosensitive area of 4 mm$^2$ and pixels as small as 3.2 $\mu$m×3.72 $\mu$m (e.g., Sony ICX238AKE). The pixel size has been intentionally shrunk to less than 4 $\mu$m×4 $\mu$m in an effort to reduce the cost of the silicon chip. In order to resolve such small pixels, the lens system must have a good contrast at spatial frequencies in excess of 125 line pairs per millimeter ("lp/mm"). This in turn implies a surface quality better than $\lambda/4$ for the lens elements. Such high surface quality can be achieved through glass polishing. In contrast, the industry-standard surface quality for plastic lenses is only 2.5$\lambda$ (ten times worse) for reasons detailed in the article entitled "An Introduction to the Design, Manufacture and Application of Plastic Optics" by Michael Missig et al. from OCLI company, the entire disclosure of which is incorporated herein by reference for all purposes.

For the foregoing reasons, while plastic lenses might seem attractive because of their low manufacturing cost, they are not suitable for applications involving image-capture devices with small pixels. For such applications, harder materials such as glass, quartz, rutile, ruby, fused silica or other such materials are preferred. For the sake of brevity, all such materials will be referred to herein as "glass," whether the material is a true glass or has crystal structure. Prior art multi-element lens systems using such materials can offer an acceptable level of performance, though at a high cost. It would be therefore desirable to have an inexpensive, simple and reliable method of fabricating, assembling and optically coupling multi-element glass lens systems to image-capture devices.

SUMMARY OF THE INVENTION

According to various embodiments of the present invention, simple and durable multi-element glass lens systems are provided. Many embodiments of these lens systems require no focusing mechanism. Accordingly, such lens systems may be bonded directly to image-capture devices. Moreover, methods are provided for simply and inexpensively fabricating, assembling and optically coupling multi-element glass lens systems to image-capture devices. According to some of these embodiments, the overall dimension of lens assemblies mounted on image-capture devices is reduced.

According to some embodiments of the present invention, an optical system is provided which includes a digital image-capture device and a lens system coupled to the digital image-capture device. The lens system includes: a first lens which is approximately spherical in shape and is coupled to the digital image-capture device by a first bonding material; and a second lens having a convex surface and a substantially planar surface, wherein at least a portion of the substantially planar surface is coupled to the first lens by a second bonding material.

According to some aspects of the present invention, a method of forming an optical system is provided. The method includes a first bonding step for attaching a first glass lens that is approximately spherical in shape to a digital image-capture device. The method also includes a second bonding step for attaching a substantially planar surface of a second glass lens to the first lens, wherein the second glass lens has a convex surface and the substantially planar surface.

According to other embodiments of the present invention, a lens system is provided which includes: a lens barrel; a first lens which is approximately spherical in shape and is disposed within the lens barrel; and a second lens having a convex surface and a substantially planar surface, wherein at least a portion of the second lens is disposed within the lens barrel and wherein the substantially planar surface is disposed proximate the first lens; and a light-absorbing bonding material disposed within a volume defined by the substantially planar surface, the first lens and the lens barrel, wherein the light-absorbing bonding material creates an apodized pupil for light transmitted within the lens barrel.

Other aspects of the present invention will appear more fully from the following description.

DETAILED DESCRIPTION OF SPECIFIC EMBODIMENTS

Multi-element glass lens systems are the ideal companions to image-capture devices. However, conventional methods of fabricating, assembling and coupling of such lens systems to image-capture devices are complex and quite expensive: lens systems can cost more than image-capture devices.

Some embodiments of the present invention reduce the manufacturing cost of a lens by mounting a glass microsphere directly onto an image-capture device. A "microsphere" as used herein is a glass sphere having a diameter in the range of approximately 0.5 mm to 10 mm. Preferred microspheres are in the range of approximately 1–3 mm.

Glass microspheres have the advantage over plastic lenses in that they do not experience shrinkage problems and can therefore maintain greater surface quality than molded plastic, i.e. <λ/2. Moreover, unlike most glass optical elements, such microspheres may be manufactured inexpensively using largely automated mass production techniques. Therefore, high quality optical imaging may be achieved with the present invention for a very low cost.

Figure 1:
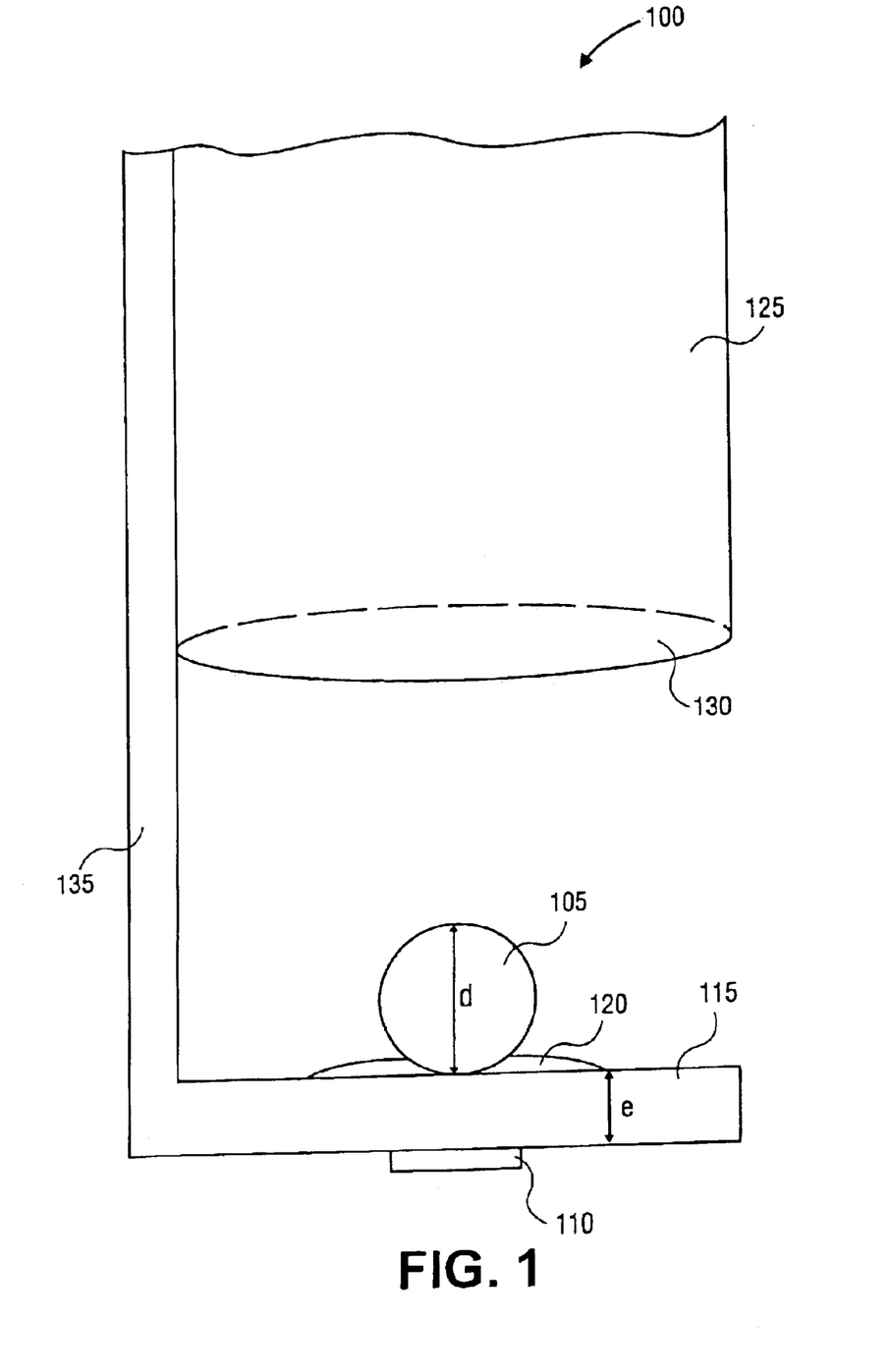
FIG. 1 illustrates an optical device including a microsphere.

In its simplest form, the lens of the present invention comprises a glass microsphere mounted onto an image-capture device. In some embodiments, the glass microsphere is not in direct contact with the image-capture device. For example, FIG. 1 depicts optical device 100, wherein microsphere 105 is separated from digital image-capture device 110 by spacer 115. In some embodiments, the portion of spacer 115 that receives microsphere 105 is concave. Microsphere 105 is attached to spacer 115 by bonding material 120, which may be epoxy, thermoplastic, gel, or other suitable bonding material. Housing 125 supports lens 130. Mount 135 connects housing 125 and spacer 115. In some embodiments, housing 125, mount 135 and spacer 115 are plastic or thermoplastic.

Spacer 115 brings the focal plane of the microsphere 105 into the plane of digital image-capture device 110. The thickness "e" of spacer 115 determines the focus of optical device 100. In some embodiments, e is approximately half the diameter "d" of microsphere 105. In embodiments wherein the refractive index "n" of spacer 115 and bonding material 120 is the same as the index of microsphere 105, optical device 100 is equivalent to a single piano-convex element and the thickness of the spacer for infinite conjugate equals d×(2−n)/(2n−2). With n=1.5, e=d/2. This design is equivalent to a single-element lens system.

In another embodiment, the refractive indices of microsphere 105, bonding material 120 and spacer 115 are different. This design is equivalent to a three-element lens system. This type of system is known as a triplet, since no air gap is present between each element. The first element is the microsphere 105 (bi-convex element), the second element is bonding material 120 (meniscus element) and the third element is spacer 115 (plano-plano or plano-concave element).

In another embodiment, a hole is provided in spacer 115, allowing bonding material 120 to reach the photosensitive area of digital image-capture device 110. In this embodiment, the optical design is reduced to a two-element system comprising the microsphere 105 (bi-convex element) and bonding material 120 (plano-plano or plano-concave element). This embodiment is preferable to the previously described embodiments, since the surface quality of the microsphere 105 may be very well controlled whereas the surface quality of spacer 115 may not be, particularly if spacer 115 is formed of plastic material.

The optical design illustrated in FIG. 1 has two limitations. First of all, a focusing adjustment may be required if the thickness of spacer 115 cannot be controlled with great accuracy. Secondly, optical device 100 is only suitable for narrow field of view applications such as barcode readers (i.e., 20 degrees or less). Optical device 100 does not provide the required performance for applications such as cellular phone cameras or notebook computer cameras, where wider field of views are necessary (i.e. 50 degrees or more).

Figure 2:
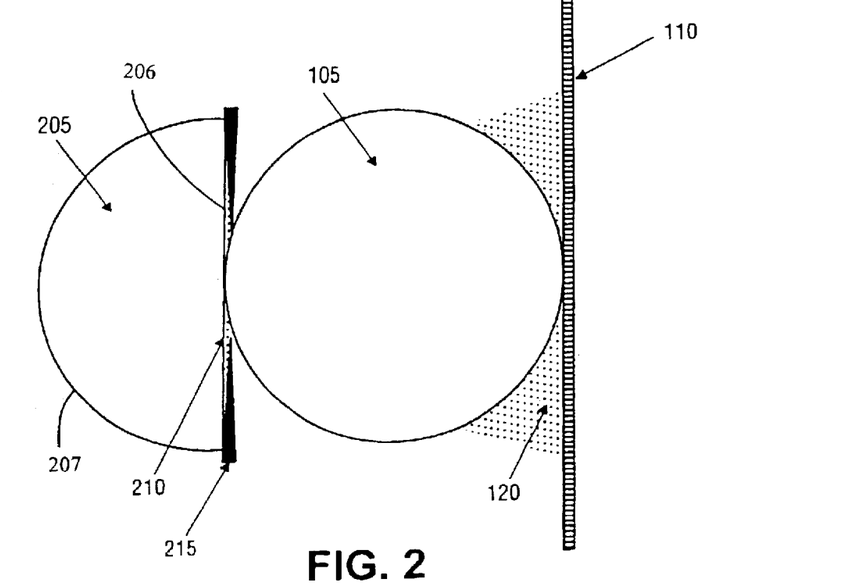
FIG. 2 depicts a microsphere bonded to a digital image-capture device and a plano-convex lens and an opaque aperture bonded to the microsphere.

According to other embodiments of the present invention, an optical combination is presented which alleviates the limitations mentioned above. This optical design does not require a focus adjustment and provides adequate performance for applications such as cellular phone cameras (i.e., a 50 degree field of view). This novel optical design consists of a microsphere mounted between a piano-convex lens and an image-capture device. As shown in FIG. 2, microsphere 105 is mounted in direct contact with image-capture device 110 without any spacer between them except for the thin layer of bonding material 120 that holds them together. Image-capture device 110 may be any sort of image-capture device, such as a CMOS or CCD imager. Plano-convex lens 205 is mounted in contact with microsphere 105 (opposite image-capture device 110) also without any spacer between them except for the thin layer of bonding material 210 that holds them together. Plano-convex lens 205 includes substantially planar side 206 and convex side 207.

A typical thickness for the thinnest portion of bonding material 210 is less than 5 μm). Bonding material 210 may be epoxy, thermoplastic, gel, or other suitable bonding material.

The desired focus is achieved by specifying the appropriate thickness of piano-convex lens 205 as well as its manufacturing tolerance. Both microsphere 105 and plano-convex lens 205 are preferably composed of glass, within the broad meaning of "glass" as defined above.

Figure 6:
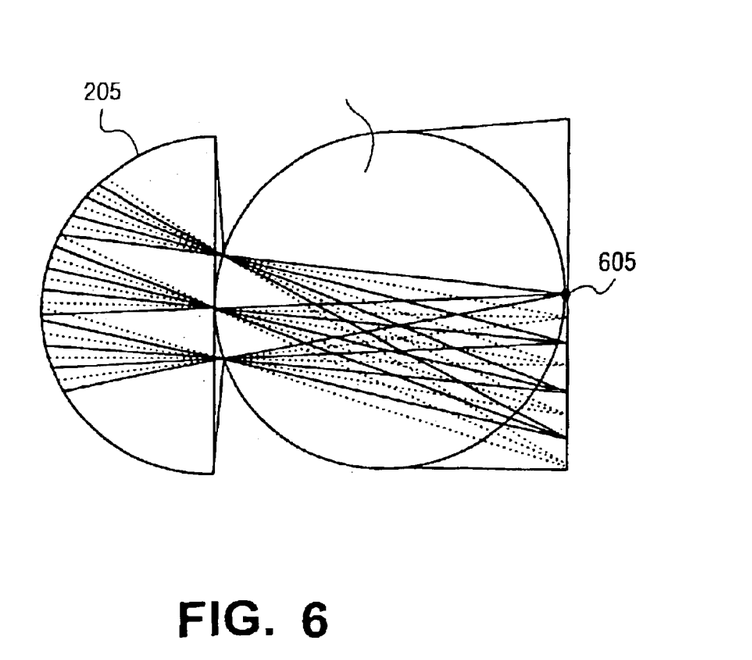
FIG. 6 is a ray-tracing diagram for light transmitted through a piano-convex lens and a microsphere.

Plano-convex lens 205 may be made from a glass microsphere that has been ground down such that its thickness is approximately half of its original diameter. The exact thickness of plano-convex lens 205 determines the focus of the optical system. The thickness of plano-convex lens 205 is calculated so as to bring the image plane of the optical system in the plane of image-capture device 110, which is in contact with the surface of microsphere 105. This effect is illustrated in FIG. 6. Point 605 is a paraxial focal point of the optical system. Point 605 can be positioned on the surface of microsphere 105 or at a selected distance from the surface. This distance can be selected, for example to account for the distance between the surface of microsphere 105 and the active portion of image-capture device 110.

The resulting optical system is a four-element glass lens in which the image plane is tangential with the surface of microsphere 105. The first element is plano-convex lens 205, the second element is formed by bonding material 210 (plano-concave element), the third element is microsphere 105 (bi-convex element) and the last element is formed by bonding material 120 (plano-concave element). With modern optical simulation software programs, it is possible to optimize this complex four-element glass lens in order to achieve the required performance level.

According to some embodiments, the glass material chosen for plano-convex lens 205 and microsphere 105 has a reflective index that is lower than index of the bonding material used to glue the various elements together. The difference in refractive indices between the glass and the bonding material allows for adequate correction of field curvature, which permits a wide field of view for the optical system. An example of glass/epoxy combination is Schott BK7 glass that has a refractive index (~1.5) that is lower than the index of Ablestick Ablelux A4021T epoxy (~1.6). Another example is Schott FK51 glass or a fused silica, which has a refractive index (~1.48) that is lower than the index of Gargille Lab Meltmount thermoplastics (1.53–1.704).

In some embodiments, colored glasses are used to filter out unwanted infrared radiation. In one embodiment, plano-convex lens 205 is fabricated from Schott BG39 or BG38 to reduce infrared radiation. Conversely, infrared radiation can be eliminated by coating the flat surface of piano-convex lens 205 with a dielectric coating known as a hot mirror (i.e. filter which reflects infrared radiation). The difference in dispersion (Abbe number) between the glass and the bonding material also allows for adequate correction of chromatic aberrations. This is an advantageous feature for color camera applications (white light conditions).

Generally speaking, a four-element glass lens permits a more efficient correction of aberrations than a single-element or two-element lens, thus resulting in higher optical performance. The correction of such aberrations is done by optimizing the shape, the index and the dispersion of the various elements. An important aspect of one embodiment of the design is the position of the pupil in the optical system. According to one embodiment, the pupil is located between plano-convex lens 205 and microsphere 105. According to another embodiment, the pupil is located on microsphere 105. The optimal aperture is f/3, which corresponds to a pupil diameter of 0.5 mm for a 2.5 mm microsphere.

It is very easy and very inexpensive to manufacture high-precision microspheres and half spheres. For example, a tumbling process may be used to form microsphere 105 and a grinding or similar process may be used to form hemispheric versions of plano-convex lens 205. However, it is difficult and expensive to manufacture a lens barrel which can hold a microsphere and hemisphere and provide the correct aperture between the two. Attempts have been made to manufacture such a barrel out of Delrin, but the aperture is so thin (in order to fit between the microsphere and hemisphere) that it becomes transparent and breaks easily. Attempts have also been made to manufacture such a barrel out of aluminum but the material is reflective and it introduces undesirable reflections in the optical system.

Figure 3:
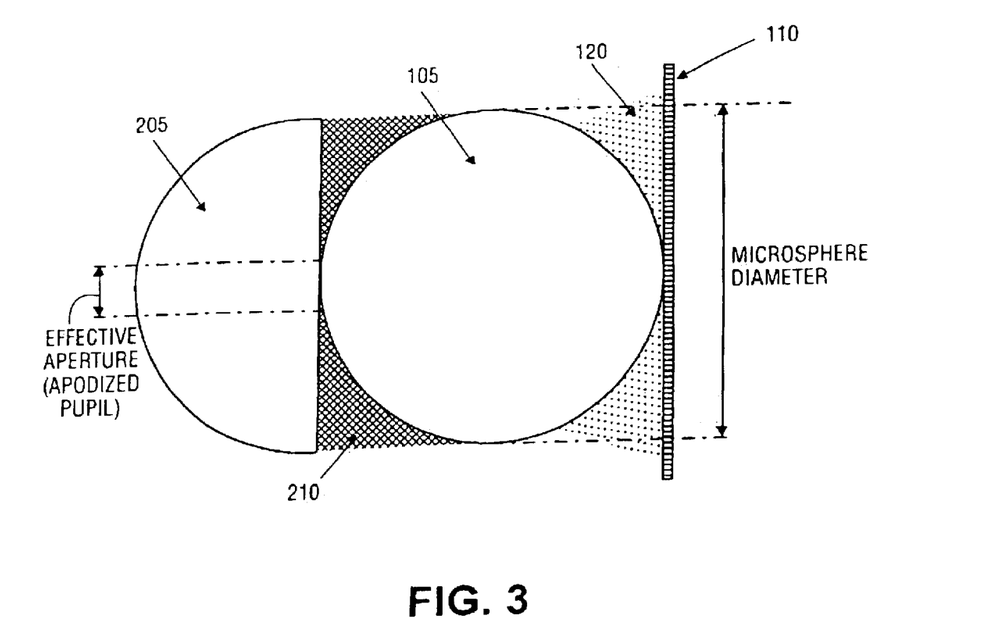
FIG. 3 depicts a microsphere bonded to a digital image-capture device and a piano-convex lens bonded to a microsphere, wherein light-absorbing bonding material fills a volume between the plano-convex lens and the microsphere, thereby forming an aperture.

According some embodiments of the present invention, a small and thin aperture is provided using a light-absorbing version of bonding material 210 between the plano-convex lens 205 and microsphere 105, as shown in FIG. 3. In the embodiment shown in FIG. 3, microsphere 105 and plano-convex lens 205 have the same radius. As the thickness of bonding material 210 increases, the transmission of light through bonding material 210 decreases. Accordingly, the amount of light-absorbing material in bonding material 210 determines the effective aperture of the optical system. The appropriate amount of light-absorbing material in bonding material 210 creates a perfectly apodized pupil, as explained below.

A perfectly apodized pupil is a pupil which transmission T varies along its radius x as a Gaussian curve, i.e., $T=\exp(-\alpha x^2)$. It is well known that the transmission T through a light-absorbing material is given by the equation $T=\exp(-\alpha d)$, where $\alpha$ is the absorption coefficient and d is the thickness of the light-absorbing material.

According to the embodiment depicted in FIG. 3, the thickness of the light-absorbing material is the thickness of bonding material 210, which is the distance between the flat side of plano-convex lens 205 and microsphere 105. This distance is given by the equation $d=x^2$, therefore the transmission $T=\exp(-\alpha x^2)$. At the point of contact between plano-convex lens 205 and microsphere 105, the thickness of bonding material 210 is typically less than 5 μm and the transmission of bonding material 210 is nearly 100%. At a point 0.25 mm away from the center of the aperture, the thickness of bonding material 210 is 50 μm and the transmission of the epoxy is less than 10%. If the diameter of microsphere 105 is approximately 2.5 mm, the effective aperture of the resulting apodized pupil is approximately 0.5 mm.

This novel apodization technique offers many benefits, some of which are listed below. First and foremost, it simplifies tremendously the manufacturing and assembly process of the lens aperture: no machining or molding of small parts with precise aperture is necessary and no alignment is required, since the aperture formed by bonding material 210 is self-aligned with the optical axis of the lens (point of contact between plano-convex lens 205 and microsphere 105). The light-absorbing bonding material also absorbs stray light and eliminates the need for a baffled lens barrel. Moreover, apodization extends both the depth of focus and the depth of field of the lens.

This apodization technique allows for different effective lens apertures for different wavelengths, if one chooses a light-absorbing material with an absorption coefficient that is different for different wavelengths. For instance, it is possible to produce a lens with an f/4 aperture for green light (in order to maximize the depth of field for the luminance channel) and f/2 aperture for blue or red light (in order to maximize signal collection for the chrominance channel).

Figure 4:
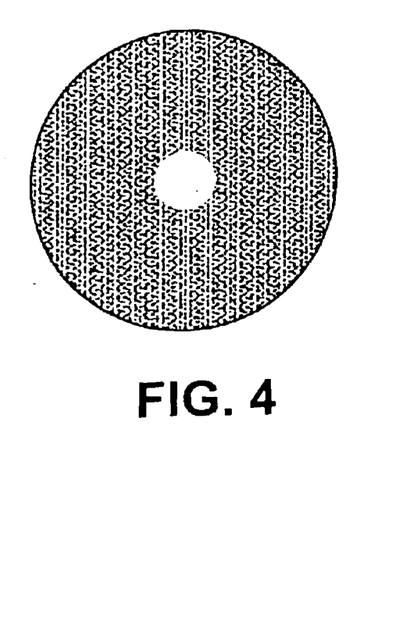
FIG. 4 depicts an aperture formed of opaque material.
Figure 5:
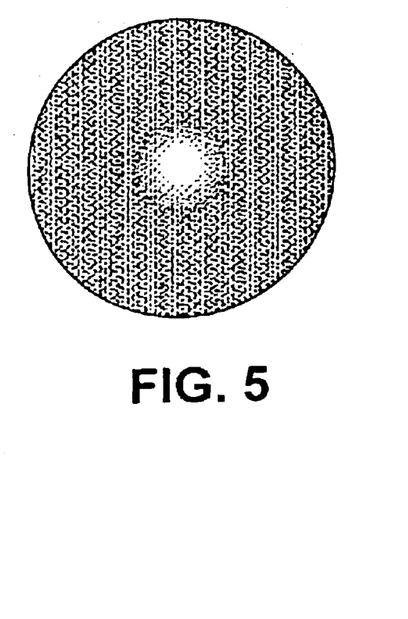
FIG. 5 depicts an aperture formed of a variable thickness of light-absorbing material disposed between a piano-convex lens and a microsphere.
Figure 7:
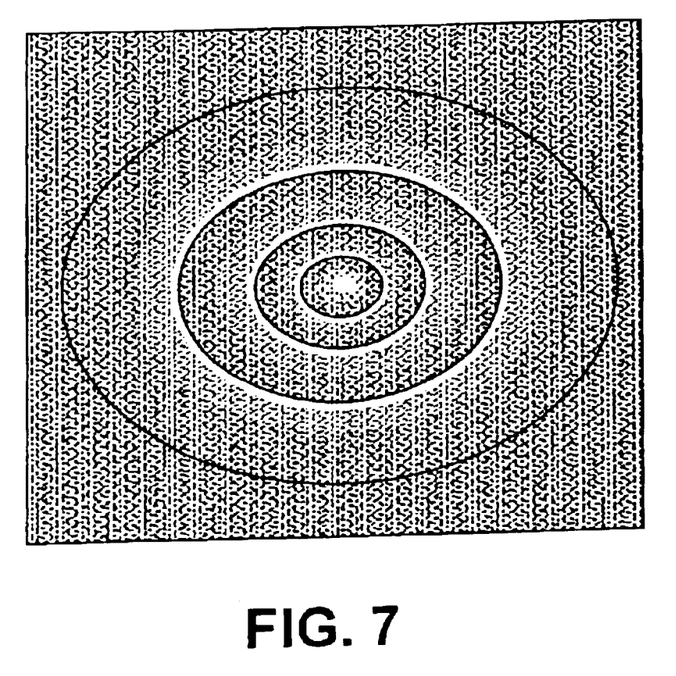
FIG. 7 illustrates a point-spread function for a non-apodized lens.
Figure 8:
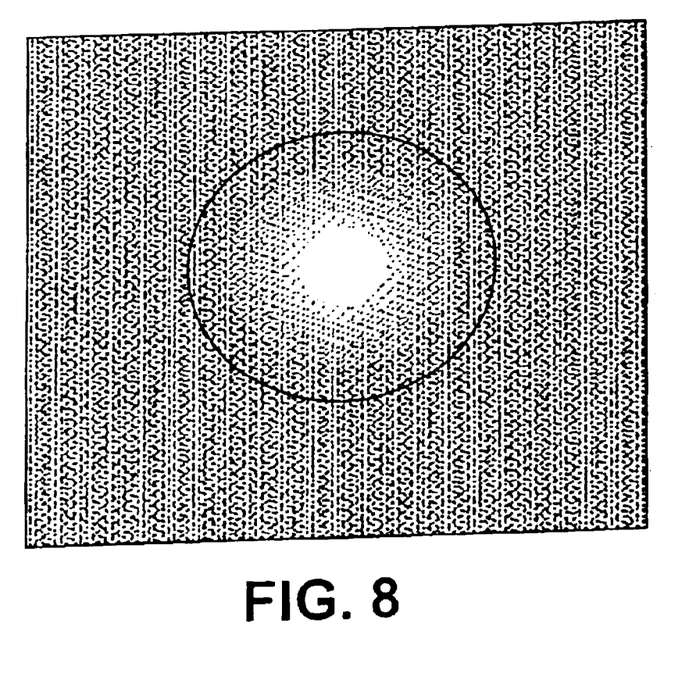
FIG. 8 illustrates a point-spread function for an apodized lens.

Another advantage of having an apodized pupil is the ability to reduce unwanted artifacts caused by diffraction effects, such as rings and halos surrounding bright spots. The image of a bright spot through a diffraction-limited lens with conventional aperture exhibits rings and halos. These rings and halos are caused by the diffraction of the light through the aperture. A circular aperture such as that shown in FIG. 4 generates a diffraction pattern known as the Airy disk (see FIG. 7), which consists of a center circular spot with multiple rings of decreasing brightness. By contrast, the diffraction pattern created by a Gaussian aperture such as that shown in FIG. 5 is a Gaussian spot (i.e. a bell-shaped spot with no objectionable rings and halos), as shown in FIG. 8. The mathematical explanation is that the Fourier transform of a Gaussian function is a Gaussian function.

One of the many applications for a lens with Gaussian aperture is a camera used as a night driving aid. In this application, the camera must be able to detect the marking on the road without being blinded by the headlights of incoming cars. The apodized lens helps reduce the glare caused by the headlights. This apodization technique brings yet another advantage over conventional apertures: it helps increase the image contrast at low spatial frequencies and decreases it at high spatial frequencies, thus reducing Moire effects.

Figure 9:
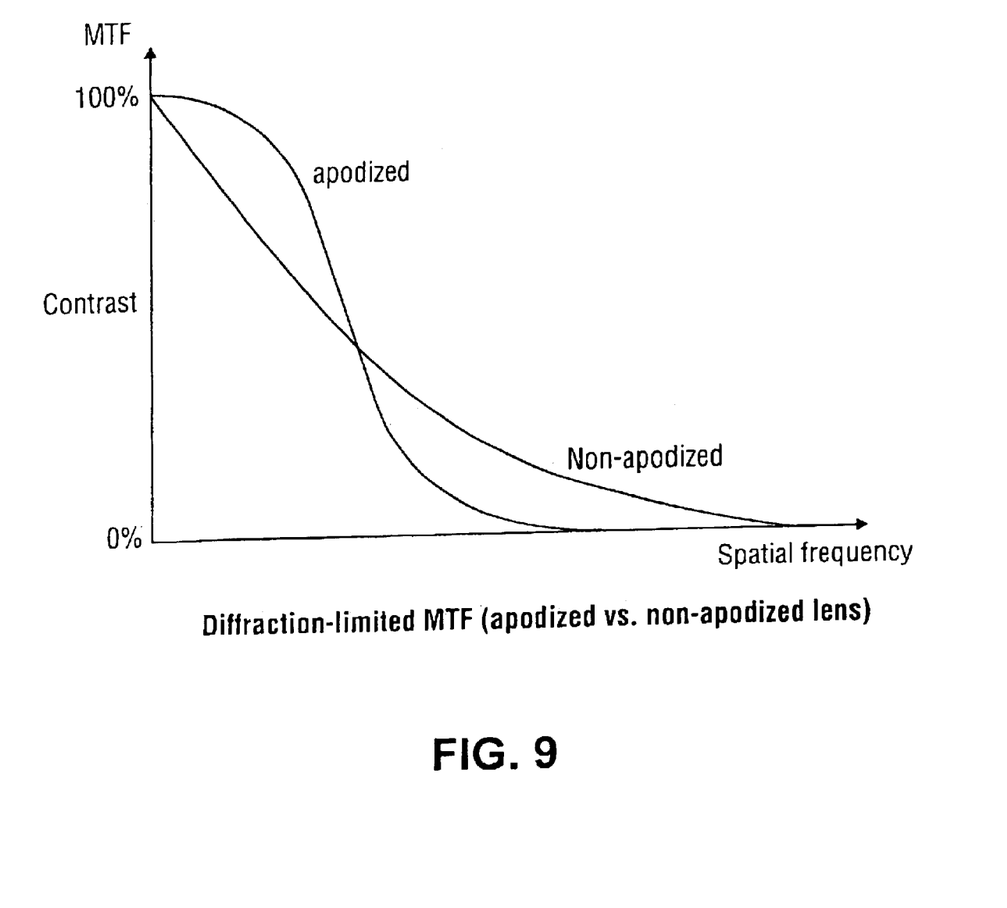
FIG. 9 is a graph that plots spatial frequency versus contrast for an apodized and a non-apodized lens.

This advantage is well illustrated by comparing the diffraction-limited MTF of an apodized lens versus a conventional lens. As shown in FIG. 9, the diffraction-limited MTF of an apodized lens is higher than of a conventional lens at low spatial frequencies but lower at high spatial frequencies. This is a particularly useful feature in terms of reducing unwanted aliasing artifacts (Moiré effects). Conventional lenses create difficult tradeoff issues between MTF and aliasing for sampled systems such as digital cameras: as the MTF is maximized below the Nyquist frequency (i.e., half the sampling frequency) in order to increase image contrast, it is also maximized above the Nyquist frequency and thus creates objectionable aliasing artifacts. Costly and cumbersome optical components (such as birefringent optical low pass filters) must be added to reduce such artifacts. By contrast, apodized lenses can be optimized for high MTF at low spatial frequencies and relatively lower MTF at higher spatial frequencies.

This apodization technique brings yet another advantage over conventional apertures: it helps increase the depth of focus and the depth of field: This is particularly important for optical systems with fixed focus, which need to image nearby objects as well as objects at infinity. This apodization technique can be extended to any optical system, including systems with dimensions and purposes which are much different from those described above.

Figure 21:
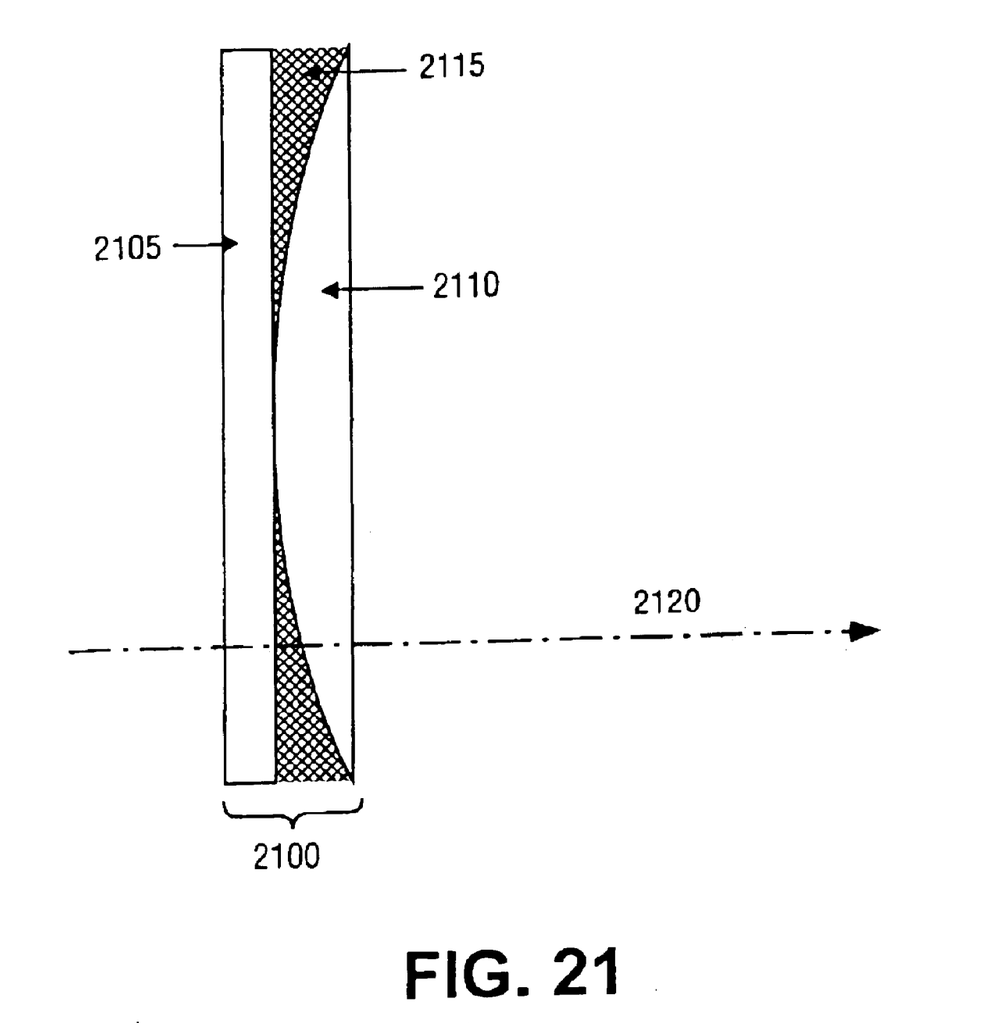
FIG. 21 depicts an apodization filter that includes a plano-convex element and a piano-plano element bonded by light-absorbing bonding material.

The apodization technique may be employed, for example, by constructing an apodization filter (with no optical power) and placing it in lieu of the conventional aperture. Referring to FIG. 21, such an apodization filter may be plano-plano element 2100, constructed by mounting plano-plano element 2105 to plano-convex element 2110 having the same refractive index, using light-absorbing bonding material 2115, which also has the same refractive index. Plano-plano element 2100 provides an apodization filter that allows light ray 2120 to pass without deviation.

Figure 22:
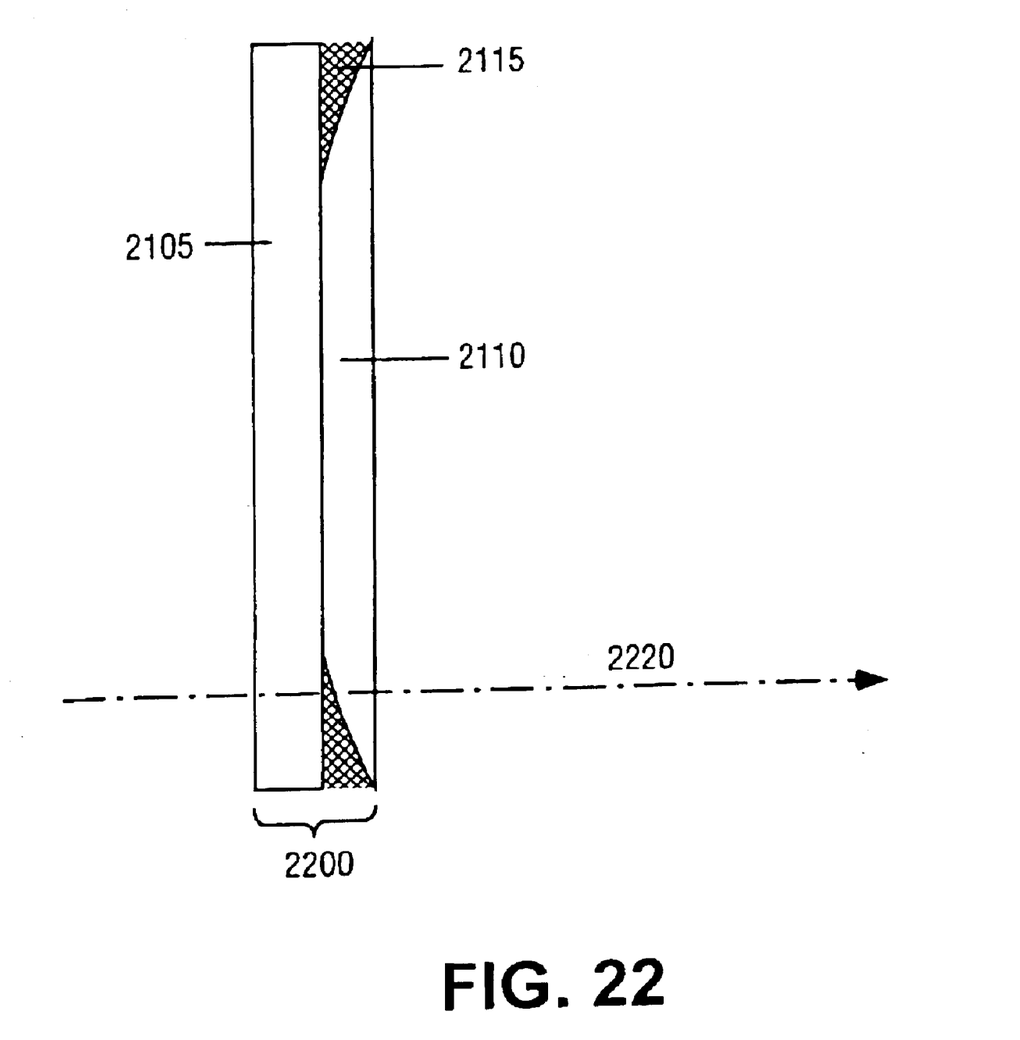
FIG. 22 depicts an apodization filter that includes a truncated plano-convex element and a piano-plano element bonded by light-absorbing bonding material.

It is possible to achieve other apodization characteristics than the Gaussian radial transmission curve by changing the shape of the plano-convex element. One such example is illustrated in FIG. 22: plano-plano element 2200 is constructed by mounting plano-plano element 2105 to truncated plano-convex element 2210 having the same refractive index, using light-absorbing bonding material 2115, which also has the same refractive index. As above, plano-plano element 2200 provides an apodization filter that allows light ray 2220 to pass without deviation.

Figure 10:
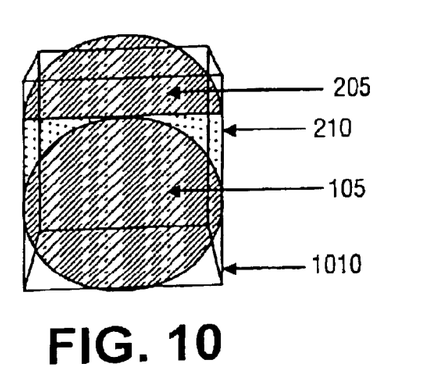
FIG. 10 illustrates a plano-convex lens and a microsphere disposed within a lens barrel having planar sides.
Figure 11:
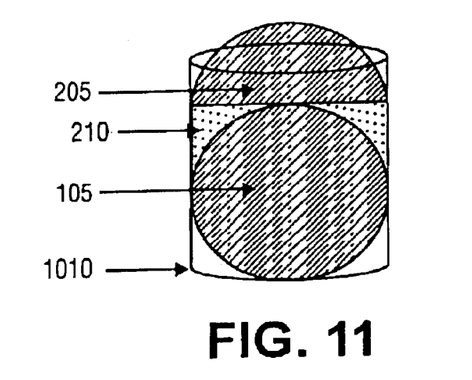
FIG. 11 illustrates a piano-convex lens and a microsphere disposed within a cylindrical lens barrel.

According to one embodiment of the present invention, the following lens prescription is suggested to achieve high image contrast up to 160 lp/mm across a 53° field of view. In this embodiment, the diameter of the hemisphere is arbitrarily set to be equal to the diameter of the microsphere, as shown in FIGS. 10 and 11. This constraint is imposed primarily in order to simplify the lens assembly. With plano-convex lens 205 and microsphere 105 of equal radius, a straight lens barrel with flat or curved sides may be used, as shown in FIGS. 10 and 11. Lens barrel 1010 has a polygonal cross-section, which is a square in this example. However, the cross-section of lens barrel 1010 may be formed into any convenient polygonal shape.

Forming lens barrel 1010 with a rectangular cross-section is desirable for a number of reasons. First of all, the footprint of the lens barrel on the image-capture device is also square and therefore does not encroach on its square or rectangular imaging area (corners of the field of view). The square cross-section barrel also allows for excess epoxy or thermoplastic material introduced between the hemisphere and microsphere to ooze out during the manufacturing process. Preferably, plano-convex lens 205 and microsphere 105 fit snugly into lens barrel 1010 or 1110 and are aligned with each other.

In some embodiments, plano-convex lens 205 and/or microsphere 105 may be ground or otherwise formed to have flat edges to securely fit adjacent to the flat sides of lens barrel 1010. However, in preferred embodiments, even flat-edged versions of microsphere 105 are nonetheless substantially spherical.

Figure 12:
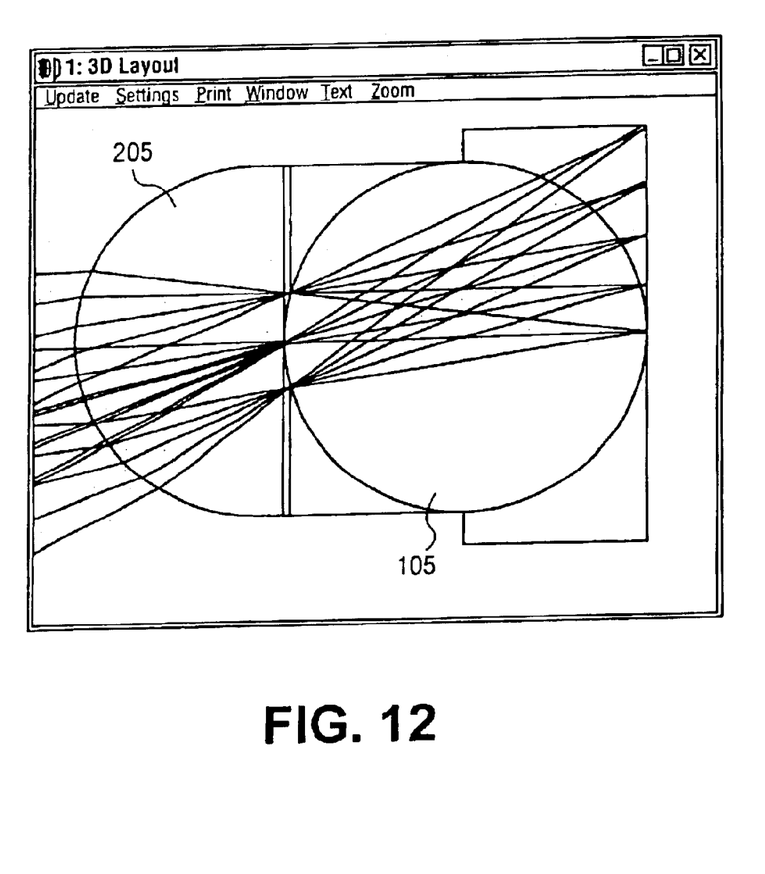
FIG. 12 is a ray-tracing diagram for light transmitted through a plano-convex lens and a microsphere having equal radii.
Figure 13:
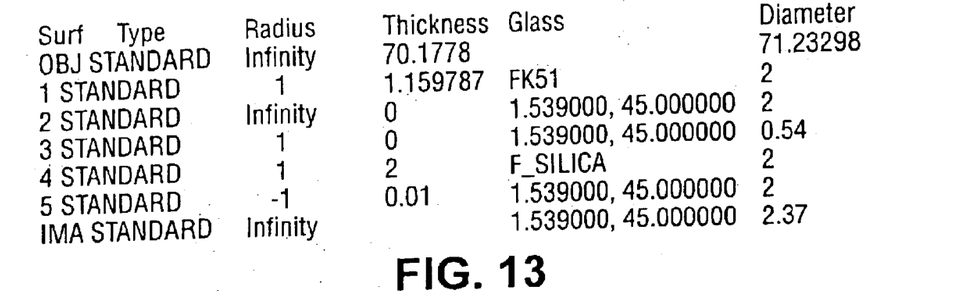
FIG. 13 is an exemplary lens prescription for a lens system including a plano-convex lens and a microsphere having equal radii.

An exemplary ray tracing simulation for plano-convex lens 205 and microsphere 105 having equal radii is shown in FIG. 12 and the corresponding lens prescription is given in FIG. 13. In this example, plano-convex lens 205 is made of FK51 glass, its diameter is 2 mm and its thickness is 1.1597 mm. Microsphere 105 is made of fused silica and its diameter is 2 mm. Here, bonding material 120 is Cargille Lab Meltmount with refractive index of 1.539 and dispersion number of 45. Such a thermoplastic material is ideal for this application since it is fluid above 65° C. and hardens below 65° C. to form a permanent mount. The mounting process is instant (no oven time) and reversible, and provides high quality optical coupling.

Figure 14:
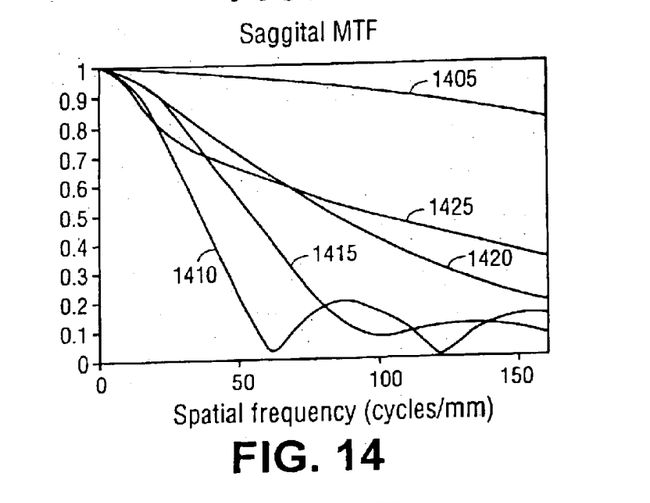
FIG. 14 is a graph of saggital modulation transfer function for a lens system including a plano-convex lens and a microsphere having equal radii.
Figure 15:
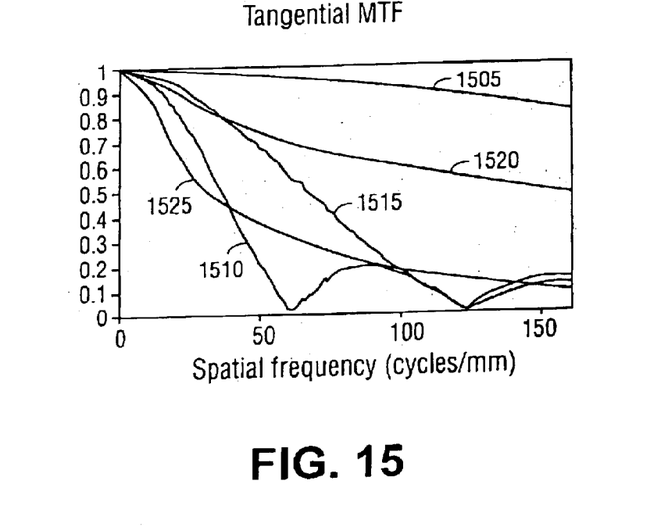
FIG. 15 is a graph of tangential modulation transfer function for a lens system including a plano-convex lens and a microsphere having equal radii.

The MTF of such a lens system is shown in FIGS. 14 and 15. FIG. 14 depicts the saggital MTF. Curve 1405 represents the ideal, diffraction-limited case. Curves 1410, 1415, 1420 and 1425 represent the MTF at 0 degrees, 26 degrees, 40 degrees and 53 degrees from the optical axis of the lens system, respectively. Here, the lens system has been focused neither at the center nor the edge of the field of view in order to provide acceptable performance throughout. In the critical portion between 0 and 50 cycles per mm, the lens system provides acceptable performance throughout the angle range.

FIG. 15 depicts the tangential MTF. Curve 1505 represents the diffraction-limited case. Curves 1510, 1515, 1520 and 1525 represent the MTF at 0 degrees, 26 degrees, 40 degrees and 53 degrees from the optical axis of the lens system, respectively. Again, in the critical portion between 0 and 50 cycles per mm, the lens system provides acceptable performance throughout the angle range.

Figure 16:
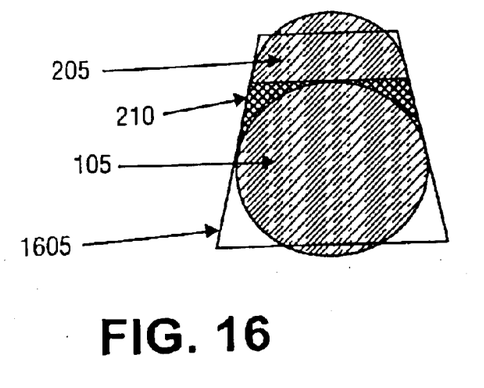
FIG. 16 illustrates a plano-convex lens and a microsphere having unequal radii disposed within a lens barrel.

According to another specific embodiment, the following lens prescription is suggested to achieve even higher image contrast up to 160 lp/mm across a 53° field of view. In this embodiment, the radius of plano-convex lens 205 is not set to be equal to the radius of microsphere 105. This constraint is removed in order to further optimize the lens performance. With plano-convex lens 205 and microsphere 105 having different radii, a conical or pyramidal lens barrel can be used, such as lens barrel 1605 shown in FIG. 16. Preferably, plano-convex lens 205 and microsphere fit snugly in lens barrel 1605 and are thus aligned with each other, forming lens system 1600.

Figure 17:
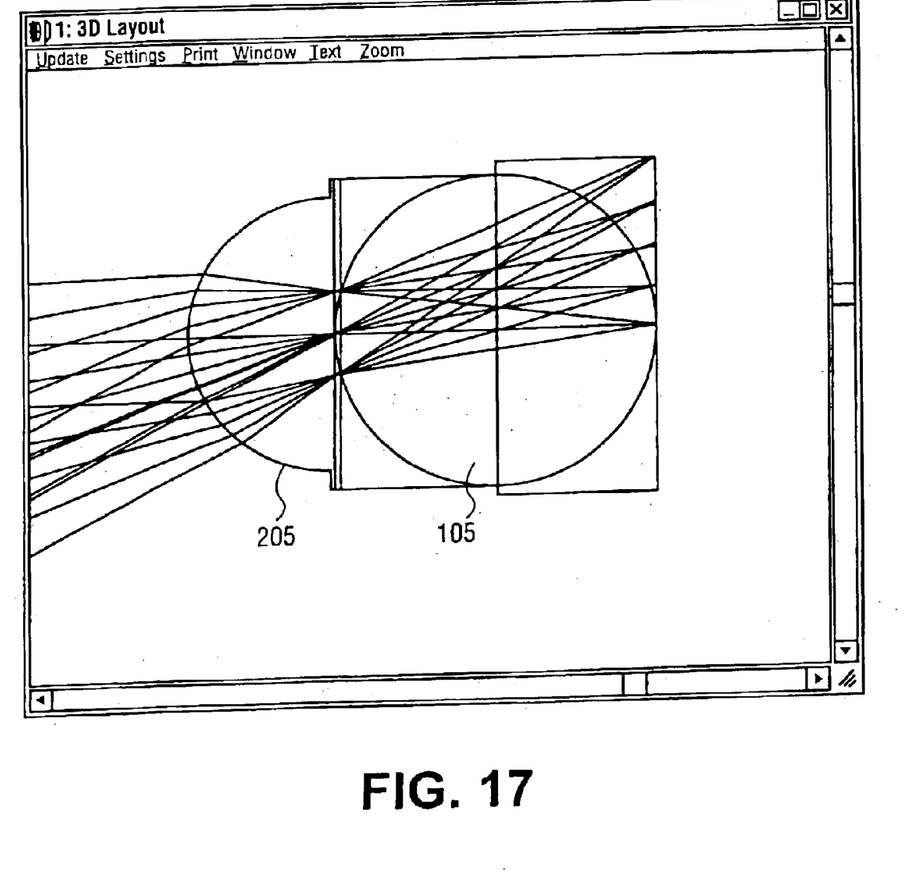
FIG. 17 is a ray-tracing diagram for light transmitted through a plano-convex lens and a microsphere having unequal radii.
Figure 18:
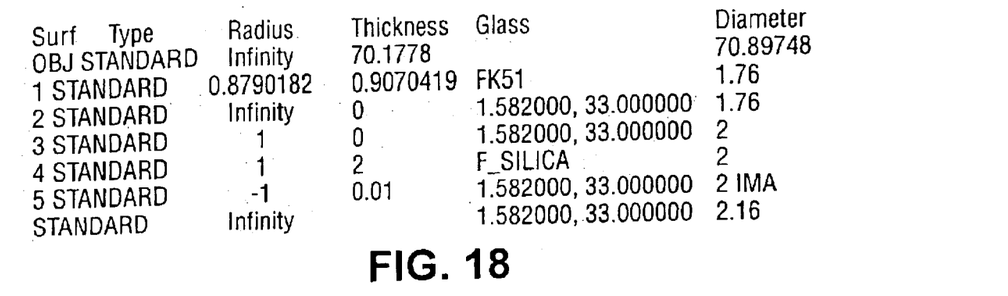
FIG. 18 is an exemplary lens prescription for a lens system including a plano-convex lens and a microsphere having unequal radii.

One exemplary ray tracing for lens system 1600 is shown in FIG. 17 and the corresponding lens prescription is given in FIG. 18. In this example, plano-convex lens 205 is made of FK51 glass, its radius is 0.879 mm and its thickness is 0.907 mm. Microsphere 105 is made of fused silica and its diameter is 2 mm. Cargille Lab Meltmount, with a refractive index of 1.582 and a dispersion number of 33, is used for bonding materials 120 and 210 in this embodiment. The MTF of such a lens system is shown in FIGS. 19 and 20.

Figure 19:
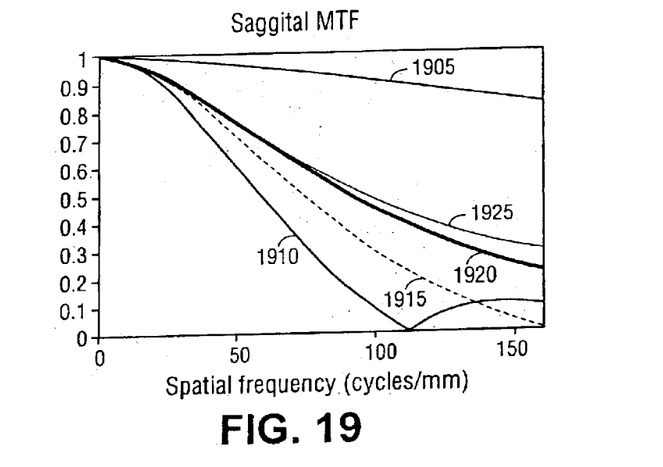
FIG. 19 is a graph of saggital modulation transfer function for a lens system including a plano-convex lens and a microsphere having unequal radii.

FIG. 19 depicts the saggital MTF for this embodiment of lens system 1600. Curve 1905 represents the diffraction-limited case. Curves 1910, 1915, 1920 and 1925 represent the MTF at 0 degrees, 26 degrees, 40 degrees and 53 degrees from the optical axis of the lens system, respectively. As before, the lens system has been focused neither at the center nor the edge of the field of view in order to provide acceptable performance throughout. In the critical portion between 0 and 50 cycles per mm, the lens system provides acceptable performance throughout the angle range.

Figure 20:
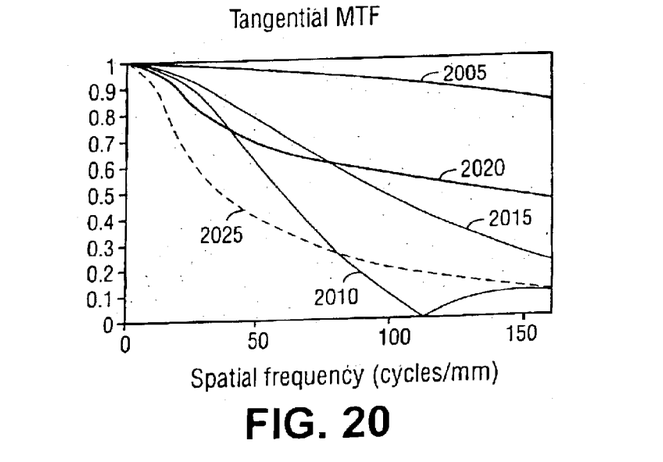
FIG. 20 is a graph of tangential modulation transfer function for a lens system including a plano-convex lens and a microsphere having unequal radii.

FIG. 20 depicts the tangential MTF for this embodiment of lens system 1600. Curve 2005 represents the diffraction-limited case. Curves 2010, 2015, 2020 and 2025 represent the MTF at 0 degrees, 26 degrees, 40 degrees and 53 degrees from the optical axis of the lens system, respectively. Again, in the critical portion between 0 and 50 cycles per mm, the lens system provides acceptable performance throughout the angle range.

Numerous light-absorbing dyes soluble in the thermoplastic material or the epoxy are available to create an apodized pupil. For example, Ciba Orasol Black is a good candidate since it is very soluble in a number of materials and it absorbs slightly more in the green than in the blue. Infrared-absorbing dyes are also available and could be used to eliminate unwanted infrared radiation in lieu of colored glass or dielectric coating.

Microlenses are often constructed over pixels of image-capture devices to focus the incoming light on their active area. The design of the microlenses relies on the refractive index step between the image-capture device and the outer medium (air). Accordingly, in another embodiment of the present invention, the lens element closest to the image-capture device is not in direct contact with its imaging area but at a very short distance of it (i.e., 10 mm or 20 mm) with an air gap in between. Placing shims between this lens element and the imaging area of the image-capture device creates the air gap. In this embodiment, the lens element closest to the image-capture device (plano-concave epoxy or thermoplastic layer) is molded before assembly to the image-capture device. The purpose of the air gap is to maintain the refractive index step between the image-capture device and the outer medium, thus allowing the is microlenses deposited on the image-capture device to work efficiently.

According to yet another embodiment, a phase mask is introduced between plano-convex lens 205 and microsphere 105 to further extend the depth of field. The purpose of the phase mask is to introduce a well-controlled blur in the image, such blur not changing significantly with the position of the object across the depth of field. It is then possible to correct such a blur electronically by processing the image with a linear convolution.

According to still another embodiment, bonding material 120 or bonding material 210 is a gel instead of an epoxy or thermoplastic. The purpose of the gel is to allow for motion between the various elements and thus the possibility of a focusing adjustment.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects.

I claim:

1. An optical system, comprising:
   a digital image-capture device; and
   a lens system coupled to the digital image-capture device, the lens system comprising:
      a first lens which is approximately spherical in shape and is coupled to the digital image-capture device by a first bonding material; and
      a second lens comprising a convex surface and a substantially planar surface, wherein at least a portion of the substantially planar surface is coupled to the first lens by a second bonding material.

2. The optical system of claim 1, wherein the first lens is in direct contact with the digital image-capture device.

3. The optical system of claim 1, wherein the substantially planar surface is in direct contact with the first lens.

4. The optical system of claim 1, wherein a thickness of the second lens is selected to cause light transmitted by the lens system to focus on the digital image-capture device.

5. The optical system of claim 1, wherein a thickness of the second lens is selected to cause a paraxial focal point of light transmitted by the lens system to be positioned proximate a surface of the first lens.

6. The optical system of claim 1, wherein the second lens is approximately hemispherical in shape.

7. The optical system of claim 1, wherein the first lens is formed of a material selected from the group consisting of true glass, quartz, rutile, ruby and fused silica.

8. The optical system of claim 1, wherein the second lens is formed of a material selected from the group consisting of true glass, quartz, rutile, ruby and fused silica.

9. The optical system of claim 1, wherein the first bonding material is substantially transparent.

10. The optical system of claim 1, wherein the second bonding material is substantially transparent.

11. The optical system of claim 1, wherein:
    the first lens has a first index of refraction;
    the second lens has a second index of refraction;
    the first bonding material has a third index of refraction; and
    the second bonding material has a fourth index of refraction; and wherein the first and second indices of refraction are each less than either of the third or fourth indices of refraction.

12. The optical system of claim 1, wherein the second bonding material comprises a light-absorbing material.

13. The optical system of claim 1, wherein the lens system further comprises a spacer disposed between the first lens and the digital image-capture device, wherein the spacer causes light transmitted by the lens system to focus on the digital image-capture device.

14. The optical system of claim 5, wherein the first lens has a first radius and the second lens has a second radius, and wherein the first radius is approximately equal to the second radius.

15. The optical system of claim 5, wherein the first lens has a first diameter and the second lens has a second diameter, and wherein the first diameter is approximately twice the second diameter.

16. The optical system of claim 12, wherein the second bonding material creates an apodized pupil.

17. The optical system of claim 12, wherein the lens system further comprises a lens barrel within which at least portions of the first lens and the second lens are disposed, and wherein the second bonding material occupies substantially all of a volume defined by the first lens, the substantially planar surface and the lens barrel.

18. The optical system of claim 12, wherein the light-absorbing material has an absorption coefficient that varies for different wavelengths of light.

19. The optical system of claim 13, wherein a thickness of the spacer is approximately half of a diameter of the first lens.

20. A method of forming an optical system, the method comprising:
    a first bonding step of attaching a first glass lens which is approximately spherical in shape to a substantially planar surface of a second glass lens, wherein the second glass lens comprises a convex surface and the substantially planar surface; and
    a second bonding step of attaching the first glass lens to a digital image-capture device.

21. The method of claim 20, wherein the first bonding step comprises the step of placing the substantially planar surface in direct contact with the first glass lens.

22. The method of claim 20, wherein the second bonding step comprises the step of placing the first glass lens in direct contact with the digital image-capture device.

23. The method of claim 20, further comprising the step of selecting a thickness of the second glass lens to cause light transmitted by the first glass lens and the second glass lens to focus on the digital image-capture device.

24. The method of claim 20, further comprising the step of selecting a thickness of the second glass lens to cause a paraxial focal point of light transmitted by the first glass lens and the second glass lens to be positioned proximate a surface of the first glass lens.

25. The method of claim 20, wherein the second glass lens is approximately hemispherical in shape.

26. The method of claim 20, wherein the first bonding step comprises bonding the substantially planar surface to the first lens using a light-absorbing bonding material, thereby creating an apodized pupil for light transmitted by the optical system.

27. The method of claim 20, further comprising the step of forming the second glass lens by grinding down a substantially spherical lens.

28. The method of claim 20, further comprising the step of forming the first glass lens by a tumbling process.

29. The method of claim 26, wherein the first bonding step further comprises the steps of:

disposing at least a portion of the first lens and a portion of the second lens within a lens barrel; and     disposing the light-absorbing bonding material within substantially all of a volume defined by the first lens, the substantially planar surface and the lens barrel.

30. An apodization filter, comprising:

a plano-plano element having a first index of refraction;

a plano-convex element comprising a convex surface and a substantially planar surface, wherein the convex surface is disposed proximate the plano-plano element; and     a light-absorbing bonding material disposed within a volume defined by the convex surface and the plano-plano element, wherein the light-absorbing bonding material creates an apodized pupil for light transmitted through the apodization filter.

31. The apodization filter of claim 30, wherein a transmission T of light varies along a radius x of the plano-convex element substantially as $T = \exp(-\alpha x^2)$, where $\alpha$ is an absorption coefficient of the light-absorbing bonding material.

32. The apodization filter of claim 30, wherein the plano-convex element is truncated.

\* \* \* \* \*